(12) United States Patent
Okada et al.

(10) Patent No.: US 12,296,472 B2
(45) Date of Patent: May 13, 2025

(54) MOBILE MANIPULATOR

(71) Applicant: OMRON Corporation, Kyoto (JP)

(72) Inventors: Tomohiro Okada, Kyoto (JP); Teisuke Katagi, Kyoto (JP)

(73) Assignee: OMRON Corporation, Kyoto (JP)

( * ) Notice: Subject to any disclaimer, the term of this patent is extended or adjusted under 35 U.S.C. 154(b) by 236 days.

(21) Appl. No.: 17/793,031

(22) PCT Filed: Feb. 5, 2021

(86) PCT No.: PCT/JP2021/004322
§ 371 (c)(1),
(2) Date: Jul. 14, 2022

(87) PCT Pub. No.: WO2021/171965
PCT Pub. Date: Sep. 2, 2021

(65) Prior Publication Data
US 2023/0044274 A1    Feb. 9, 2023

(30) Foreign Application Priority Data

Feb. 27, 2020 (JP) .................................. 2020-032230

(51) Int. Cl.
*B66F 9/06* (2006.01)
*B25J 9/00* (2006.01)
*B25J 18/00* (2006.01)

(52) U.S. Cl.
CPC ............. *B25J 9/0009* (2013.01); *B25J 18/00* (2013.01)

(58) Field of Classification Search
CPC ............................... B66F 9/063; B65G 1/0492
See application file for complete search history.

(56) References Cited

U.S. PATENT DOCUMENTS

| | | | |
|---|---|---|---|
| 4,698,775 A * | 10/1987 | Koch ..................... | G05D 1/027 |
| | | | 414/940 |
| 9,550,624 B2 * | 1/2017 | Khodl ...................... | B25J 5/007 |
| 9,707,879 B2 * | 7/2017 | Mecklinger ............. | B66F 9/063 |
| 10,343,881 B2 * | 7/2019 | Guo ......................... | B25J 9/047 |
| 11,235,930 B2 * | 2/2022 | Bastian, II ........... | B25J 15/0616 |

(Continued)

FOREIGN PATENT DOCUMENTS

| CN | 1531049 | 9/2004 |
|---|---|---|
| CN | 105658551 | 6/2016 |

(Continued)

OTHER PUBLICATIONS

JP H06-218678 A (Hitachi, Ltd.) Aug. 9, 1994 (English language machine translation). [online] [retrieved Jun. 4, 2024]. Retrieved from: espacenet. (Year: 1994).*

(Continued)

*Primary Examiner* — Jonathan Snelting
(74) *Attorney, Agent, or Firm* — JCIPRNET

(57) ABSTRACT

In order to allow for the mounting of two transported objects without increasing the width of a transport vehicle, a mobile manipulator (1) is provided with: an unmanned transport vehicle (2); a robot base portion (3) mounted on the unmanned transport vehicle; a robot arm (4) mounted on the robot base portion; and brackets (5), (6) for mounting cassettes (11) over the robot base portion. The bracket (5) holds the cassettes in an inclined state, and a part of the bracket (6) overlaps the bracket (5) in plan view.

16 Claims, 6 Drawing Sheets

(56) References Cited

U.S. PATENT DOCUMENTS

Figure 1:
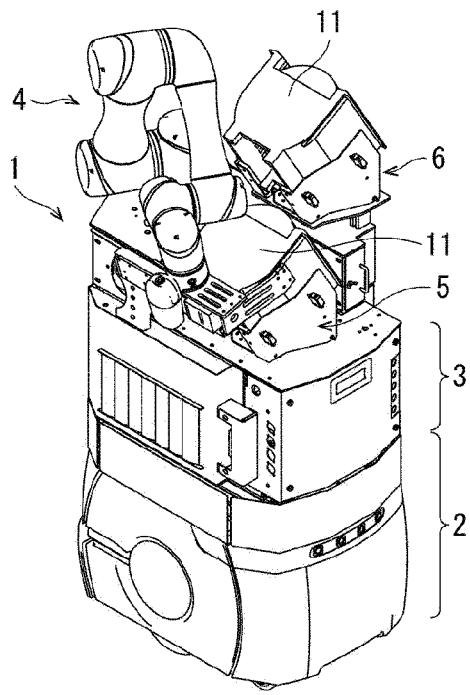
Figure 1:
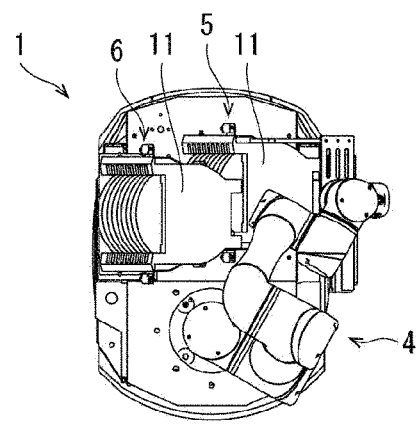
Figure 1:
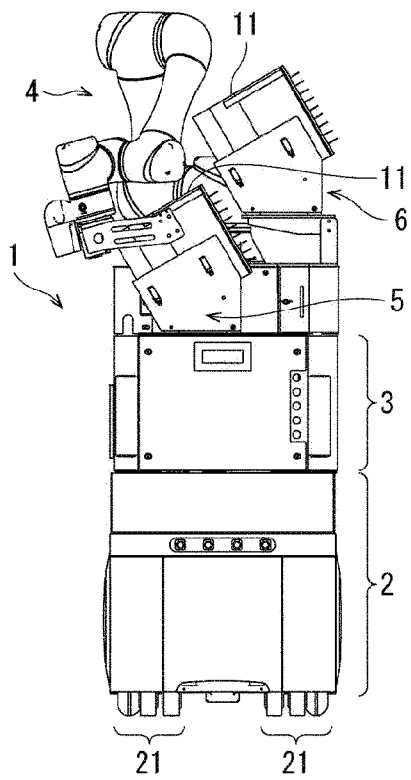
Figure 1:
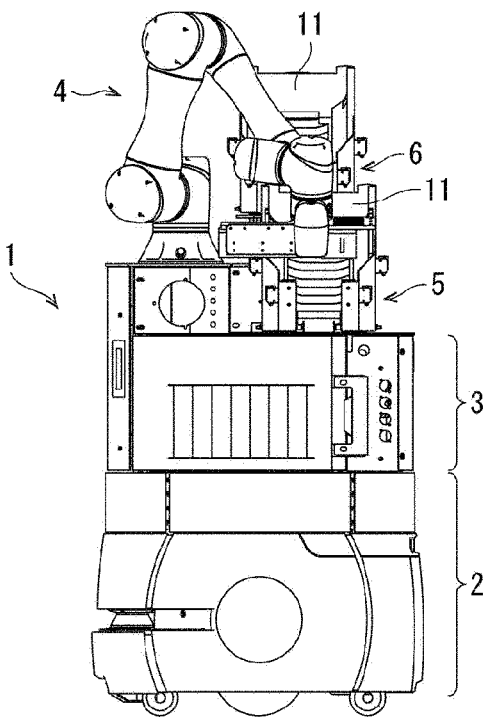

2015/0073589 A1   3/2015   Khodl et al.
2018/0305124 A1   10/2018  Guo et al.
2019/0210221 A1*  7/2019   Delaporte .............. B25J 9/1682

FOREIGN PATENT DOCUMENTS

| JP | H0469713 | 3/1992 |
| JP | H104189483 | 7/1992 |
| JP | H05190648 | 7/1993 |
| JP | H06218678 | 8/1994 |
| JP | H0851136 | 2/1996 |
| JP | 2000252686 | 9/2000 |
| JP | 2001306148 | 11/2001 |
| JP | 2002286091 | 10/2002 |
| JP | 2016159389 | 9/2016 |
| JP | 2017141102 | 8/2017 |
| WO | 2016103304 | 6/2016 |

OTHER PUBLICATIONS

"International Search Report (Form PCT/ISA/210) of PCT/JP2021/004322," mailed on Mar. 30, 2021, with English translation thereof, pp. 1-6.

"Written Opinion of the International Searching Authority (Form PCT/ISA/237) of PCT/JP2021/004322," mailed on Mar. 30, 2021, with English translation thereof, pp. 1-8.

"First Office Action Notification (National Phase Entry of PCT Application) of China Counterpart Application", issued on Dec. 11, 2024, with English translation thereof, pp. 1-17.

* cited by examiner (a) Perspective view (b) Plan view (c) Front view (d) Lateral view (a) Perspective view (b) Plan view (c) Front view (d) Lateral view (a) Plan view (b) Lateral view (c) Front view (a) Perspective view (b) Plan view (c) Lateral view (d) Front view (a) Perspective view (b) Plan view (c) Lateral view (d) Front view (a) Plan view (b) Lateral view (c) Front view

MOBILE MANIPULATOR

CROSS-REFERENCE TO RELATED APPLICATION

This application is a 371 application of the International PCT application serial no. PCT/JP2021/004322, filed on Feb. 5, 2021, which claims the priority benefits of Japan Patent Application No. 2020-032230, filed on Feb. 27, 2020. The entirety of each of the above-mentioned patent applications is hereby incorporated by reference herein and made a part of this specification.

TECHNICAL FIELD

The present invention relates to a mobile manipulator.

RELATED ART

At semiconductor factories, semiconductor products are manufactured based on materials that comply with the standards (hereinafter referred to as wafers) through various processes. In many cases, a person performs the work of transporting these wafers from one process to the next process with use of a device (hereinafter referred to as a cassette) that is capable of transporting several wafers as a set. However, due to labor shortage, there are many requests to automate the wafer transport work performed by people.

CITATION LIST

Patent Literature

[Patent Literature 1] Japanese Patent Laid-Open No. 2001-306148

SUMMARY OF INVENTION

Technical Problem

What is important in automating the transport work (hereinafter referred to as automatic transport) is to transport two cassettes at the same time.

When only one cassette can be transported, an unmanned transport vehicle will go to pick up the processed cassette, mount it, transport it to the next process, go to pick up a new cassette, and transport it. Therefore, it is uneconomic. However, when there is a space for transporting two cassettes at the same time, the unmanned transport vehicle can pick up the processed cassette and set a new cassette in the apparatus. Accordingly, the uneconomic issue can be reduced.

Nevertheless, if two cassettes are mounted side by side, the size (width) of the unmanned transporter becomes large, and the swiveling radius increases.

For the semiconductor industry in Japan, because the width of the passage in the factory is often narrow, there is a problem that the environment that can introduce an unmanned transporter is limited. If the width of the passage in the factory is increased, there is a problem that the cost rises.

One aspect of the present invention is to mount two transported objects without increasing the width of the transport vehicle.

Solution to Problem

In order to solve the above problems, a mobile manipulator according to one aspect of the present invention includes an unmanned transport vehicle, a robot base portion mounted on the unmanned transport vehicle, a robot arm mounted on the robot base portion, and a first mounting portion and a second mounting portion which are arranged on the robot base portion and on which a predetermined transported object is mounted. The first mounting portion holds the transported object in a state where a bottom surface of the transported object is inclined with respect to a horizontal, and a part of the second mounting portion overlaps on the first mounting portion in a plan view.

Effects of Invention

According to one aspect of the present invention, two transported objects can be mounted without increasing the width of the transport vehicle.

BRIEF DESCRIPTION OF DRAWINGS (a), (b), (c), and (d) of FIG. 1 are respectively a perspective view, a plan view, a front view, and a lateral view showing the appearance of the mobile manipulator according to an embodiment of the present invention.

Figure 2:
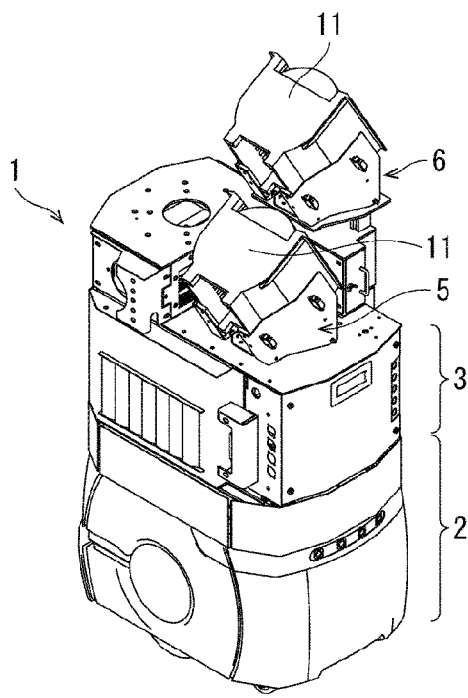
Figure 2:
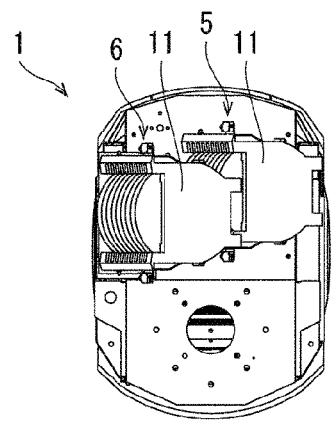
Figure 2:
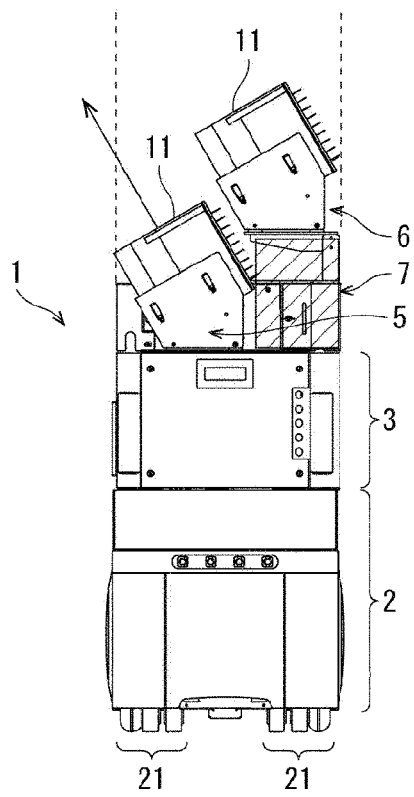
Figure 2:
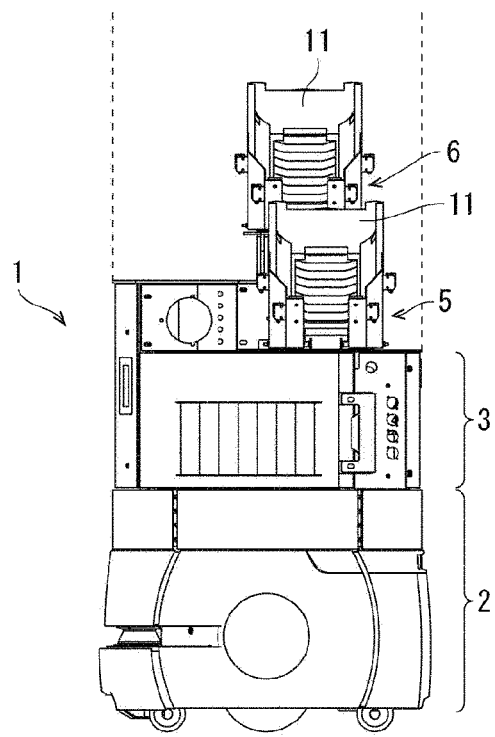

(a), (b), (c), and (d) of FIG. 2 are respectively a perspective view, a plan view, a front view, and a lateral view showing the appearance of the mobile manipulator according to an embodiment of the present invention.

Figure 3:
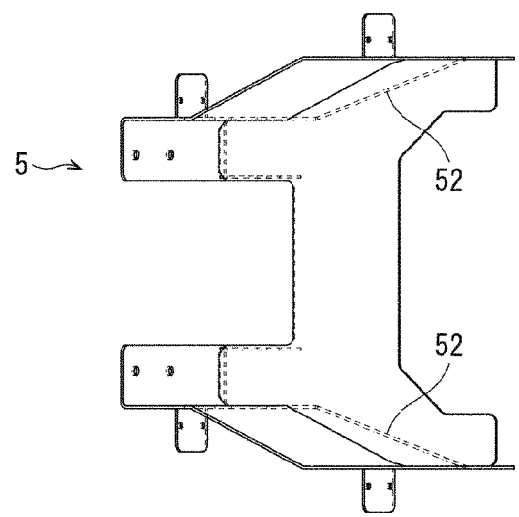
Figure 3:
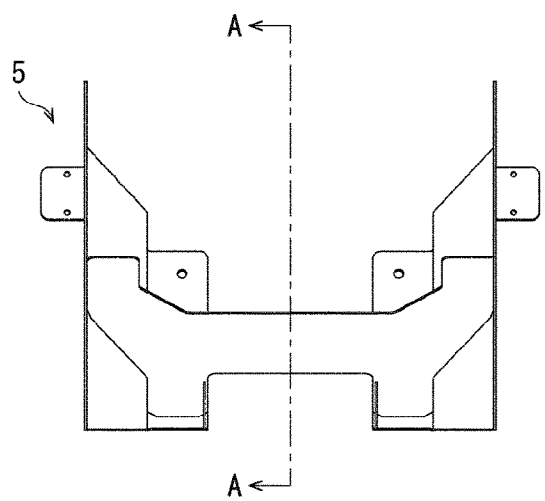
Figure 3:
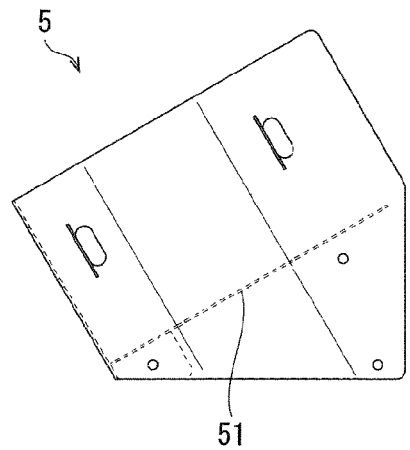

(a), (b), and (c) of FIG. 3 are respectively a plan view, a lateral view, and a front view showing the appearance of the bracket according to an embodiment of the present invention.

Figure 4:
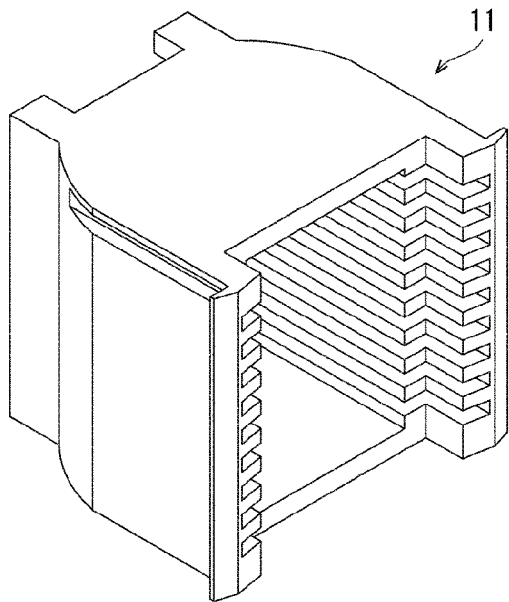
Figure 4:
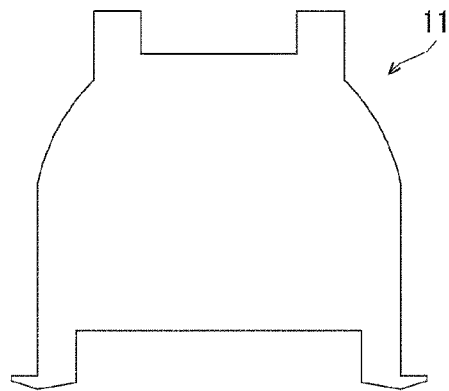
Figure 4:
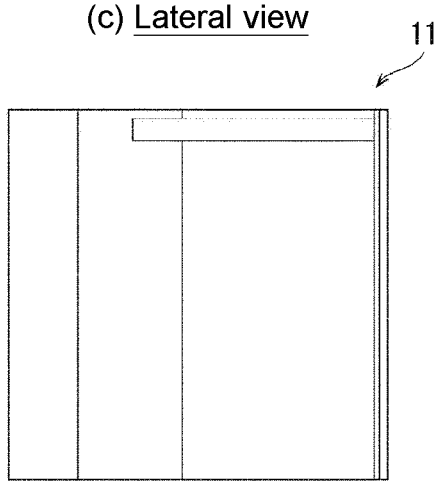
Figure 4:
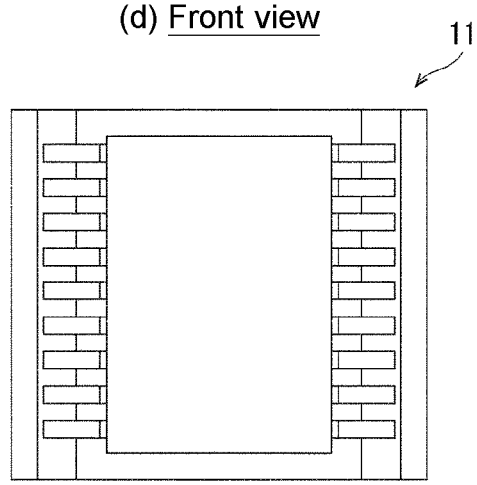

(a), (b), (c), and (d) of FIG. 4 are respectively a perspective view, a plan view, a lateral view, and a front view showing the appearance of the cassette according to an embodiment of the present invention.

Figure 5:
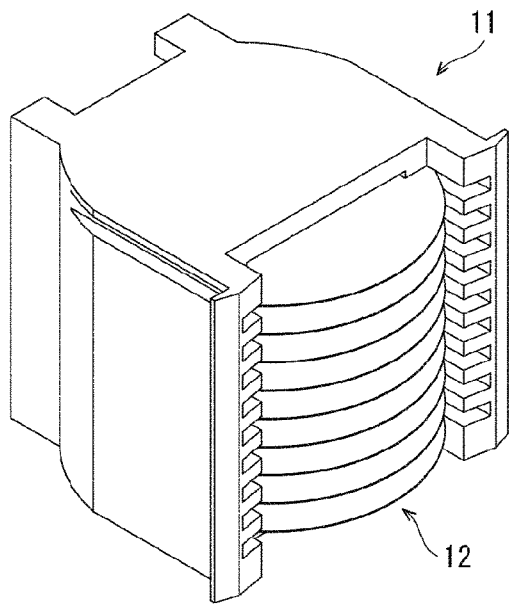
Figure 5:
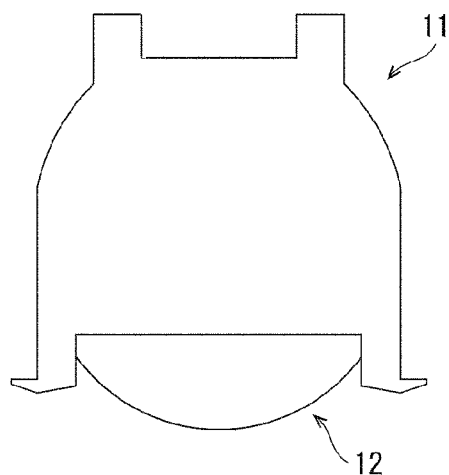
Figure 5:
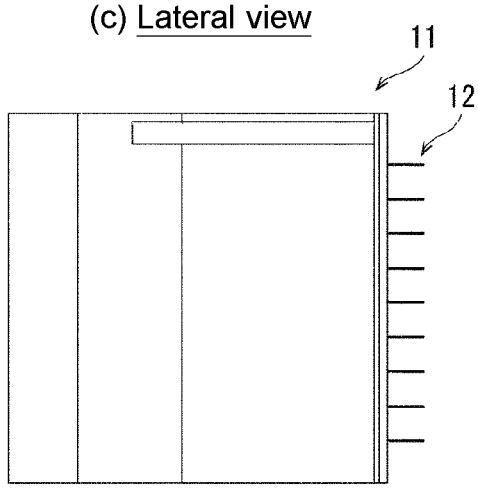
Figure 5:
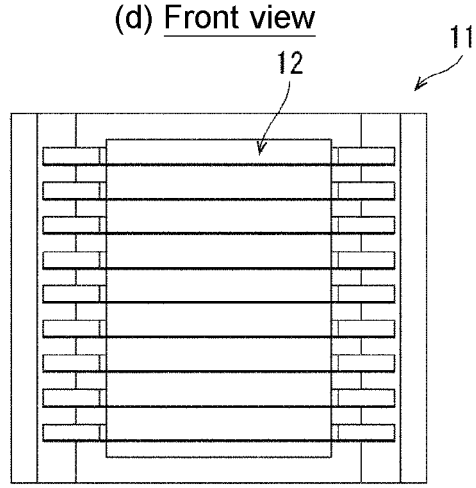

(a), (b), (c), and (d) of FIG. 5 are respectively a perspective view, a plan view, a lateral view, and a front view showing the appearance of the cassette according to an embodiment of the present invention.

Figure 6:
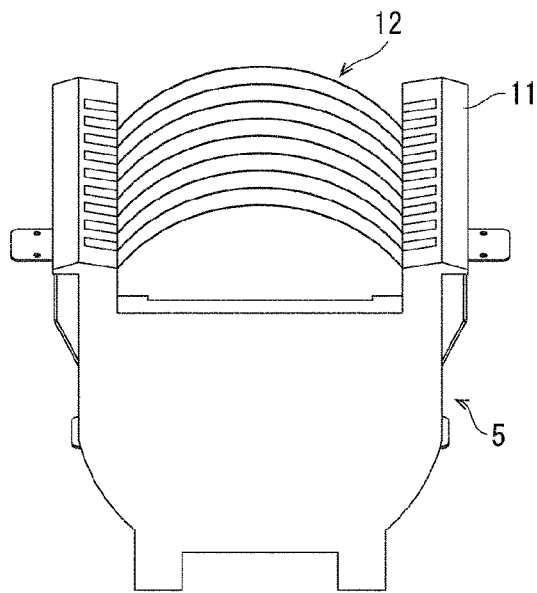
Figure 6:
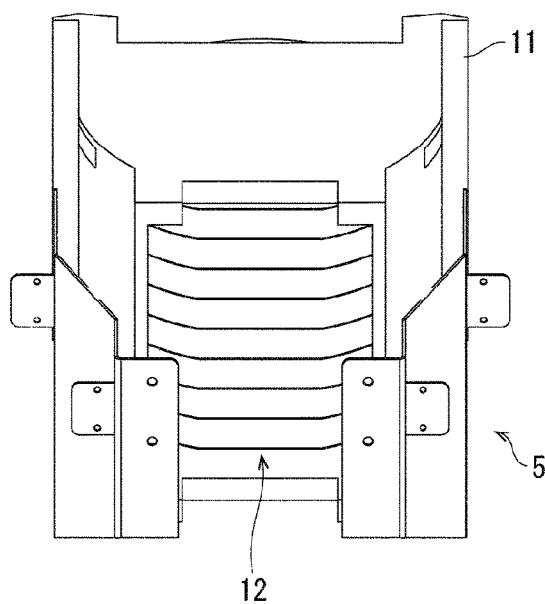
Figure 6:
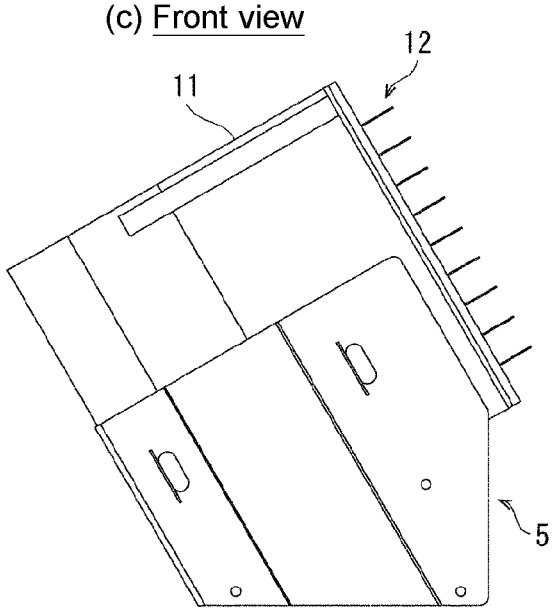

(a), (b), and (c) of FIG. 6 are respectively a plan view, a lateral view, and a front view showing the appearances of the bracket and the cassette according to an embodiment of the present invention.

DESCRIPTION OF EMBODIMENTS

Hereinafter, an embodiment according to one aspect of the present invention (hereinafter also referred to as "the present embodiment") will be described with reference to the drawings.

1. Application Example (Appearance and Configuration of the Mobile Manipulator 1)

(a), (b), (c), and (d) of FIG. 1 and (a), (b), (c), and (d) of FIG. 2 are respectively perspective views, plan views, front views, and lateral views showing the appearance of a mobile manipulator 1 according to the present embodiment. FIG. 1 includes a robot arm 4. FIG. 2 does not include the robot arm 4. Both FIG. 1 and FIG. 2 show a perspective view, a plan view, a front view, and a lateral view of the mobile manipulator 1. The mobile manipulator 1 transports a cassette (transported object) 11 and arranges the cassette 11 in a predetermined location.

As shown in FIG. 1, the mobile manipulator 1 includes an unmanned transport vehicle 2, a robot base portion 3, the robot arm 4, a bracket (first mounting portion) 5, and a bracket (second mounting portion) 6. The unmanned transport vehicle 2 is the lower half portion of the lower side of a base of the robot arm 4, and includes left and right wheels 21. The unmanned transport vehicle 2 moves by rotating the left and right wheels 21, and changes the direction by controlling the rotation speed and the rotation direction of the left and right wheels 21. The robot base portion 3 is the upper half portion of the lower side of the base of the robot arm 4 and is mounted on the unmanned transport vehicle 2. The robot base portion 3 includes a controller that controls the left and right wheels 21 and the robot arm 4, a communication unit that communicates with the outside, etc.

The robot arm 4 is mounted on the robot base portion 3 and moves the cassette (predetermined transported object) 11 between the brackets 5 and 6 and the predetermined location. The bracket 5 and the bracket 6 are arranged on the robot base portion 3 and are mounting portions on which the cassette 11 is mounted.

As shown in the front views of (c) of FIG. 1 and (c) of FIG. 2, the bracket 5 holds the cassette 11 in a state where the bottom surface of the cassette 11 is inclined with respect to the horizontal. Then, as shown in the plan views and the front views of (b) and (c) of FIG. 1 and (b) and (c) of FIG. 2, a part of the bracket 6 overlaps on the bracket 5 in the plan view.

Further, the bracket 6 may hold the cassette 11 in a state where the bottom surface of the cassette 11 is inclined with respect to the horizontal.

As shown in the plan view, the front view, and the lateral view of (b), (c), and (d) of FIG. 2, the brackets 5 and 6 may be arranged so as to fit inside a footprint of the unmanned transport vehicle 2. The footprint is a projected area of the unmanned transport vehicle 2 in a top view, and is an area shown by the broken lines in the front view and the lateral view of (c) and (d) of FIG. 2. In fact, the brackets 5 and 6 are accommodated between the two broken lines in the front view and the lateral view of (c) and (d) of FIG. 2.

As shown in the front view of (c) of FIG. 2, the bracket 6 may be arranged at a position avoiding a space in a direction perpendicular to the bottom surface of the cassette 11 from the cassette 11 mounted on the bracket 5. That is, in the front view of (c) of FIG. 2, the bracket 6 is not arranged in the direction of the arrow from the bracket 5.

As a result, the robot arm 4 can take out the cassette 11 straight from the bracket 5 (in the direction of the arrow) and insert the cassette 11 straight into the bracket 5 without being interfered by the bracket 6.

As shown in the front view of (c) of FIG. 2, a device 7 may be arranged in a space located in the right direction (lateral direction) of the bracket 5 and in the lower direction of the bracket 6. That is, in the front view of (c) of FIG. 2, since the shaded portion is located in the right direction of the bracket 5 and in the lower direction of the bracket 6, the space becomes empty. Therefore, the device 7 such as a control device and an operation switch may be arranged.

(a), (b), and (c) of FIG. 3 are respectively a plan view, a lateral view, and a front view showing the appearance of the bracket 5 according to the present embodiment. FIG. 3 shows a plan view, a lateral view, and a front view of the bracket 5. The appearance of the bracket 6 is the same as the appearance of the bracket 5.

As shown in FIG. 3, the bracket 5 may have a bottom surface support wall 51 and two side surface support walls 52. At that time, the bottom surface support wall 51 supports the bottom surface of the cassette 11. The two side surface support walls 52 support two side surfaces of the cassette 11 and face each other. Then, the two side surface support walls 52 form a tapered shape that narrows toward the bottom surface of the cassette 11. The two side surfaces of the cassette 11 respectively contact the corresponding side surfaces of the side surface support walls 52. Since the bracket 5 is installed below the bracket 6, it may be difficult to mount the cassette 11, but the bracket 5 has the side surface support walls 52 in a tapered shape, so the cassette 11 can be easily positioned.

(Appearance of the Cassette 11)

(a), (b), (c), and (d) of FIG. 4 and (a), (b), (c), and (d) of FIG. 5 are respectively perspective views, plan views, lateral views, and front views showing the appearance of the cassette 11 according to the present embodiment. FIG. 4 does not include a wafer 12. FIG. 5 includes the wafer 12. Both FIG. 4 and FIG. 5 show a perspective view, a plan view, a lateral view, and a front view of the cassette 11.

As shown in FIG. 5, a plurality of wafers 12 are inserted into the cassette 11.

(Appearances of the Brackets 5 and 6 and the Cassette 11)

(a), (b), and (c) of FIG. 6 are respectively a plan view, a lateral view, and a front view showing the appearances of the bracket 5 and the cassette 11 according to the present embodiment. FIG. 6 shows a plan view, a lateral view, and a front view of the bracket 5 and the cassette 11. The appearance of the bracket 6 is the same as the appearance of the bracket 5.

As shown in FIG. 6, a plurality of wafers 12 are inserted into the cassette 11.

Effects of the Present Embodiment

The cassettes 11 are held obliquely instead of being arranged side by side, which allows the cassette 11 to be taken out and put in obliquely, unlike the conventional technology in which the cassette 11 is taken out from the horizontal and vertical directions. As a result, it is possible to secure a space for mounting two cassettes 11 even in a narrow space. Therefore, the mobile manipulator 1 can be introduced even in an existing factory where the width of the passage is narrow.

A mobile manipulator according to one aspect of the present invention includes: an unmanned transport vehicle, a robot base portion mounted on the unmanned transport vehicle, a robot arm mounted on the robot base portion, and a first mounting portion and a second mounting portion which are arranged on the robot base portion and on which a predetermined transported object is mounted. The first mounting portion holds the transported object in a state where a bottom surface of the transported object is inclined with respect to a horizontal, and a part of the second mounting portion overlaps on the first mounting portion in a plan view.

According to the above configuration, since a part of the second mounting portion overlaps on the first mounting portion, two transported objects can be mounted without increasing the width of the transport vehicle. Further, even though a part of the second mounting portion overlaps on the first mounting portion, the robot arm can take out the inclined transported object in the oblique direction. As a result, it is possible to secure a space for mounting two transported objects and to introduce the unmanned transporter (mobile manipulator) even in an existing factory where the width of the passage is narrow.

In an embodiment, in the mobile manipulator, the first mounting portion and the second mounting portion are arranged so as to fit inside a footprint of the unmanned transport vehicle.

Generally, the unmanned transport vehicle moves, turns, etc. without recognizing the size of the structure mounted on the upper surface. If the structure on the upper surface protrudes from the footprint, it may collide with surrounding objects, for example, when the unmanned transport vehicle turns. According to the above configuration, since the first mounting portion and the second mounting portion fit within the footprint, it is possible to prevent the first mounting portion and the second mounting portion from colliding with surrounding objects while the unmanned transport vehicle is turning.

In an embodiment, in the mobile manipulator, the second mounting portion is arranged at a position avoiding a space in a direction perpendicular to the bottom surface of the transported object from the transported object mounted on the first mounting portion.

According to the above configuration, the mounted object can be taken out and put in linearly in a direction perpendicular to the bottom surface (that is, the oblique direction). Therefore, there is no need for operations such as lifting up and moving laterally. In addition, it is not necessary to switch between operations such as ascending and moving laterally, and it is possible to quickly take out and put in the transported object.

In an embodiment, in the mobile manipulator, the second mounting portion holds the transported object in a state where the bottom surface of the transported object is inclined with respect to the horizontal.

According to the above configuration, since both the first mounting portion and the second mounting portion hold the transported object in a state where the bottom surface of the transported object is inclined with respect to the horizontal, the robot arm can take out and put in two transported objects in the same oblique direction at the same time.

In an embodiment, in the mobile manipulator, the first mounting portion has a bottom surface support wall that supports the bottom surface of the transported object, and two side surface support walls that support two side surfaces of the transported object and face each other, and the two side surface support walls form a tapered shape.

According to the above configuration, the transported object having side surfaces in a corresponding tapered shape can be positioned simply by placing the transported object.

In an embodiment, in the mobile manipulator, a device is arranged in a space located in a lateral direction of the first mounting portion and located in a lower direction of the second mounting portion.

According to the above configuration, the device such as a control device and an operation switch can be arranged in the space created by shifting the second mounting portion upward.

The present invention is not limited to the embodiments described above, and various modifications can be made within the scope of the claims. The technical scope of the present invention also includes embodiments obtained by appropriately combining the technical means disclosed in different embodiments.

What is claimed is:

1. A mobile manipulator, comprising:
    an unmanned transport vehicle;
    a robot base portion mounted on the unmanned transport vehicle;
    a robot arm mounted on the robot base portion; and
    a first mounting portion and a second mounting portion which are arranged on the robot base portion and on which a predetermined transported object is mounted,
    wherein the first mounting portion holds the transported object in a state where a bottom surface of the transported object is inclined with respect to a horizontal, and
    a part of the second mounting portion overlaps on the first mounting portion in a plan view,
    wherein the first mounting portion and the second mounting portion respectively have a first bottom surface support wall and a second bottom surface support wall that support the bottom surface of the transported object,
    the second bottom surface support wall is located above a plane including the first bottom surface support wall.

2. The mobile manipulator according to claim 1, wherein the first mounting portion and the second mounting portion are arranged so as to fit inside a footprint of the unmanned transport vehicle.

3. The mobile manipulator according to claim 2, wherein the second mounting portion is arranged at a position avoiding a space in a direction perpendicular to the bottom surface of the transported object from the transported object mounted on the first mounting portion.

4. The mobile manipulator according to claim 2, wherein the second mounting portion holds the transported object in a state where the bottom surface of the transported object is inclined with respect to the horizontal.

5. The mobile manipulator according to claim 2, wherein the first mounting portion further has two side surface support walls that support two side surfaces of the transported object and face each other, and
    the two side surface support walls form a tapered shape.

6. The mobile manipulator according to claim 2, wherein a device is arranged in a space located in a lateral direction of the first mounting portion and located in a lower direction of the second mounting portion.

7. The mobile manipulator according to claim 1, wherein the second mounting portion is arranged at a position avoiding a space in a direction perpendicular to the bottom surface of the transported object from the transported object mounted on the first mounting portion.

8. The mobile manipulator according to claim 7, wherein the second mounting portion holds the transported object in a state where the bottom surface of the transported object is inclined with respect to the horizontal.

9. The mobile manipulator according to claim 7, wherein the first mounting portion further has two side surface support walls that support two side surfaces of the transported object and face each other, and
    the two side surface support walls form a tapered shape.

10. The mobile manipulator according to claim 7, wherein a device is arranged in a space located in a lateral direction of the first mounting portion and located in a lower direction of the second mounting portion.

11. The mobile manipulator according to claim 1, wherein the second mounting portion holds the transported object in a state where the bottom surface of the transported object is inclined with respect to the horizontal.

12. The mobile manipulator according to claim 11, wherein the first mounting portion further has two side surface support walls that support two side surfaces of the transported object and face each other, and
    the two side surface support walls form a tapered shape.

13. The mobile manipulator according to claim 11, wherein a device is arranged in a space located in a lateral direction of the first mounting portion and located in a lower direction of the second mounting portion.

14. The mobile manipulator according to claim 1, wherein the first mounting portion further has two side surface support walls that support two side surfaces of the transported object and face each other, and the two side surface support walls form a tapered shape.

15. The mobile manipulator according to claim 14, wherein a device is arranged in a space located in a lateral direction of the first mounting portion and located in a lower direction of the second mounting portion.

16. The mobile manipulator according to claim 1, wherein a device is arranged in a space located in a lateral direction of the first mounting portion and located in a lower direction of the second mounting portion.

* * * * *